APPLIED SEQUENCE IDENTIFICATION DEVICE

Filed Dec. 4, 1963 10 Sheets-Sheet 1

INVENTORS
HERBERT B. BASKIN
RAYMOND E. BONNER
BY Francis J. Thomas
ATTORNEY

APPLIED SEQUENCE IDENTIFICATION DEVICE

Filed Dec. 4, 1963

Sept. 13, 1966 H. B. BASKIN ET AL 3,273,130
APPLIED SEQUENCE IDENTIFICATION DEVICE
Filed Dec. 4, 1963 10 Sheets-Sheet 5
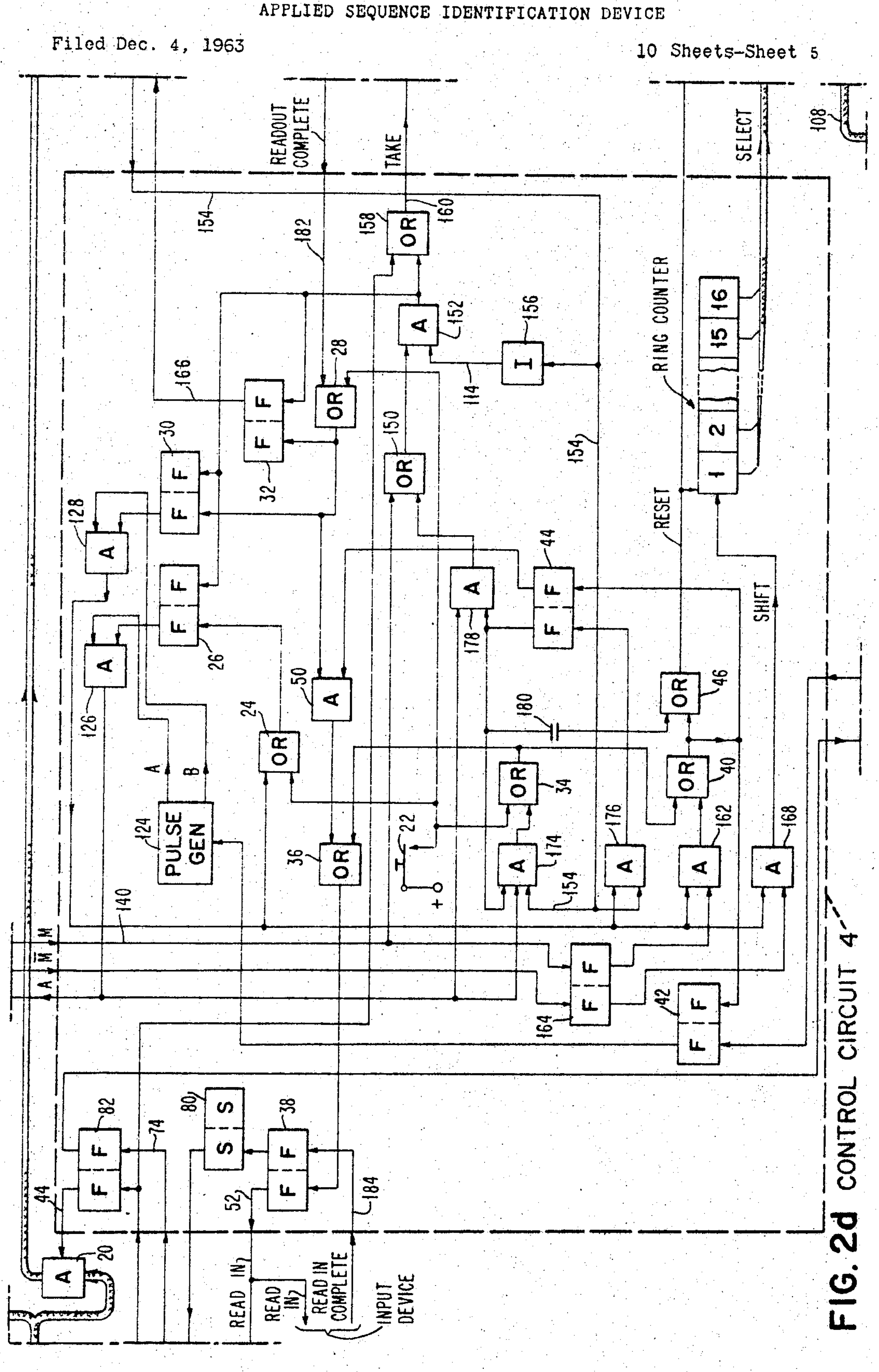
FIG. 2d CONTROL CIRCUIT 4

APPLIED SEQUENCE IDENTIFICATION DEVICE 3,273,130
APPLIED SEQUENCE IDENTIFICATION DEVICE

Herbert B. Baskin, Mohegan Lake, and Raymond E. Bonner, Yorktown Heights, N.Y., assignors to International Business Machines Corporation, New York, N.Y., a corporation of New York Filed Dec. 4, 1963, Ser. No. 327,916
25 Claims. (Cl. 340—172.5)

Figures 1, 2:
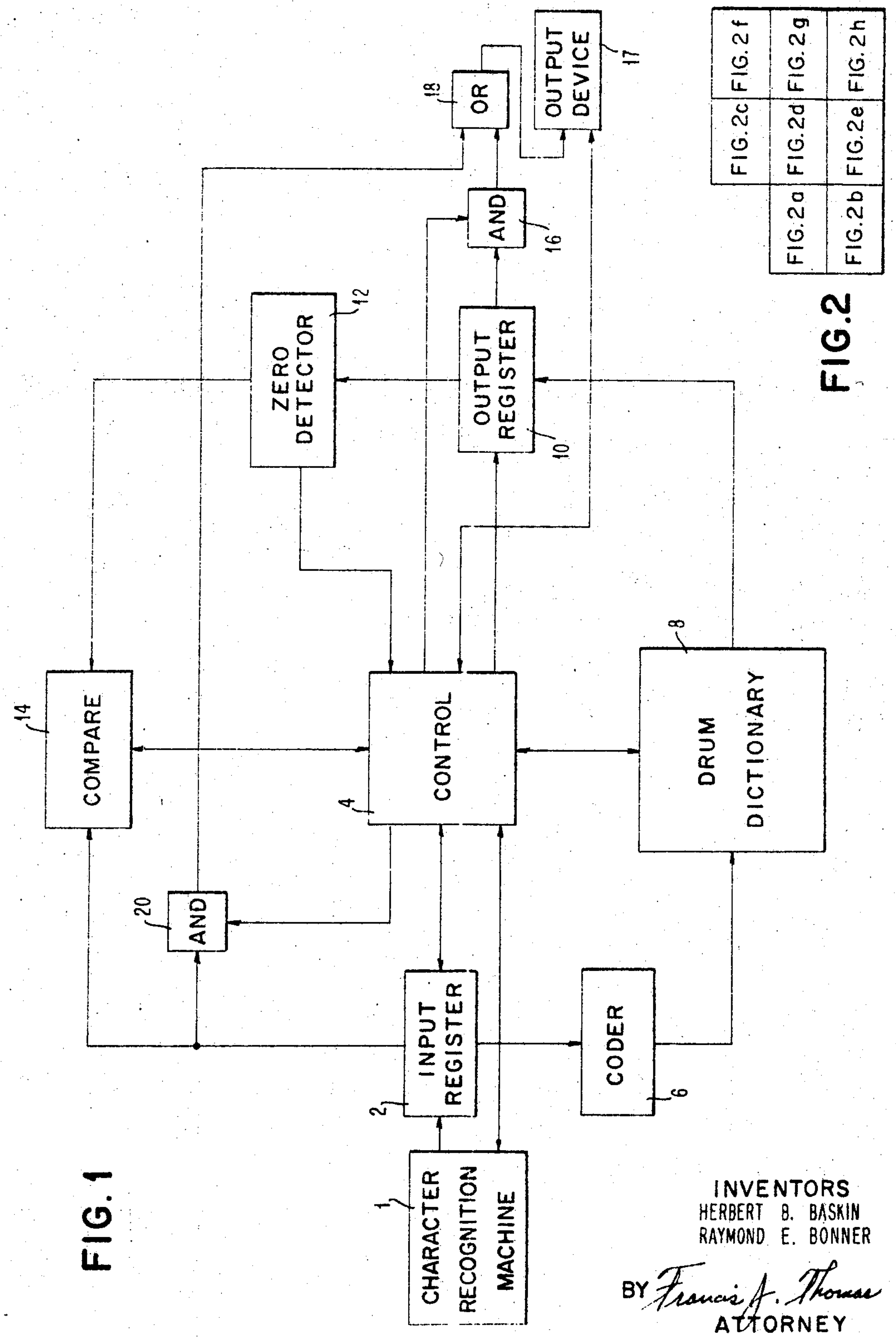

This invention relates to specimen identification techniques and, in particular, to techniques for recognizing sequences of specimens, such as written words.

It is often necessary to convert data from the form in which it is available to a form that is usable by automatic computing apparatus such as accounting machines and language translating devices. The data is often available in the form of written documents, but may be in many other forms, such as spoken words. The required conversion has traditionally been accomplished with great accuracy by human-operated machine input devices, such as card punch machines where a human interprets the data that is applied and generates machine-usable data in the form of perforations in cards. There have been many recent attempts to automate this operation, particularly with character recognition devices which scan the input documents containing printed or written symbols, identify the symbols, and generate machine-usable data such as punched cards, magnetic tape, etc. Although automatic recognition machines are much faster than human operators, the machines are generally unable to correct errors in the source data. Additional errors are sometimes introduced by the recognition machine when symbols are smudged, misaligned, or defective in other respects, and when the document background is of poor quality (spotted, dirty, perforated, etc.). Human operators are often able to correctly interpret symbols under these conditions, particularly when sequences of symbols are combined to form words, sentences or paragraphs. For example, if the "D" in the word "DIG" has the appearance of an "O," the operator recognizes that "OIG" is not a "valid" word and the error is corrected.

The present invention makes use of the inherent redundancy in language, wherein many words are not "valid" words, in order to automatically correct errors. Only a very small percentage of the available number of letter sequences form valid words—for example, there are over ten million ($26^5$) possible five-letter sequences formed from the 26 letters in the English alphabet, yet there are only about 500,000 words in the English language, and only a fraction of these are five-letter words.

Many of the errors and rejects developed by character recognition systems have been found to concern certain confusion sets of letters—for example, "H" and "N" are often confused as when the open (white) regions in the "N" are rounded by blurring or smudging. Most words can be recognized without distinguishing the letters in these confusion sets. To continue the example, the word THINK does not require the "H" and "N" be distinguished, as the alternatives: THIHK, TNINK and TNIHK are not valid words. That is, the word THINK can be represented without confusion as the sequence of T, H or N, I, H or N, K. In the present invention, confusion sets are not distinguished except for the rare cases where distinction is required to avoid ambiguity. An example of an ambiguous situation requiring distinction between H and N occurs with SHOW and SNOW. In this case, the representation S, H or N, O, W is ambiguous and the recognition system is required to make the relatively difficult distinction between H and N.

The present invention employs a technique which converts the output of a character recognition system into a compact set of code symbols—one new system for each letter of the alphabet that does not fall into a confusion set, and one new symbol for each confusion set. The generated sequence of code symbols is then compared to stored code-symbol sequences to provide an indication of the identity of the word to be recognized. When ambiguity exists, the unconverted recognition system output is also examined and the correct word is selected.

Thus, the present invention makes use of the redundancy in language to enable words to be accurately recognized that would be unidentifiable in many cases if the unnecessary distinction between certain easily-confused sets of letters were required. The invention is particularly described with respect to word recognition but is obviously suitable for use in identifying other sequences of specimens or events, such as speech and cryptographic data.

It is a primary object of the present invention to show techniques for recognizing specimen groups.

A further object of the present invention is to show techniques for recognizing specimen groups containing specimens in a redundant first representation or language, such as alphabetic symbols by converting the specimens into a less redundant, second representation which has a member corresponding to each set of one or more members of the first representation.

Another object of the present invention is to show techniques for recognizing words comprising sequences of alphabetic letters by converting the letters to a set of code symbols, where each code symbol corresponds to one or more alphabetic letters.

A further object is to show techniques for recognizing an applied sequence of symbols in a redundant notation by converting the applied sequence into a second sequence which is less redundant, and then comparing the second sequence with reference sequences.

A further object is to show techniques for recognizing an applied sequence of symbols in a redundant notation by converting the applied sequence into a second sequence which is less redundant to select at least one meaningful sequence, and then comparing at least one meaningful sequence with the applied sequence, to identify the applied sequence.

A further object is to show techniques for recognizing an applied sequence of symbols in a redundant notation by converting the applied sequence into a second sequence which is less redundant to select at least one meaningful sequence, and then unambiguously selecting the meaningful sequence when only one exists or the meaningful sequence which matches the applied sequence when more than one meaningful sequence exists, or ambiguously selecting more than one meaningful sequence when more than one exists and none matches the applied sequence.

A further object is to show techniques for recognizing an applied sequence of symbols in a redundant notation by converting the applied sequence into a second sequence which is less redundant to select at least one meaningful sequence and indicating the identity of the applied sequence to be the indicated meaningful sequence when only one meaningful sequence is indicated.

A still further object is to show techniques for recognizing an applied sequence of symbols in a redundant notation by converting the applied sequence into a second sequence which is less redundant to select at least one meaningful sequence and indicating the identity of the applied sequence to be one of the indicated meaningful sequences.

The foregoing and other objects, features and advantages of the invention will be apparent from the following more particular description of a preferred embodiment of the invention, as illustrated in the accompanying drawings.

In the drawings:

FIG. 1 is a block diagram of a preferred embodiment of the invention.

FIGS. 2*a* through 2*h* are detailed diagrams of the preferred embodiment of FIG. 1.

Figure 3:
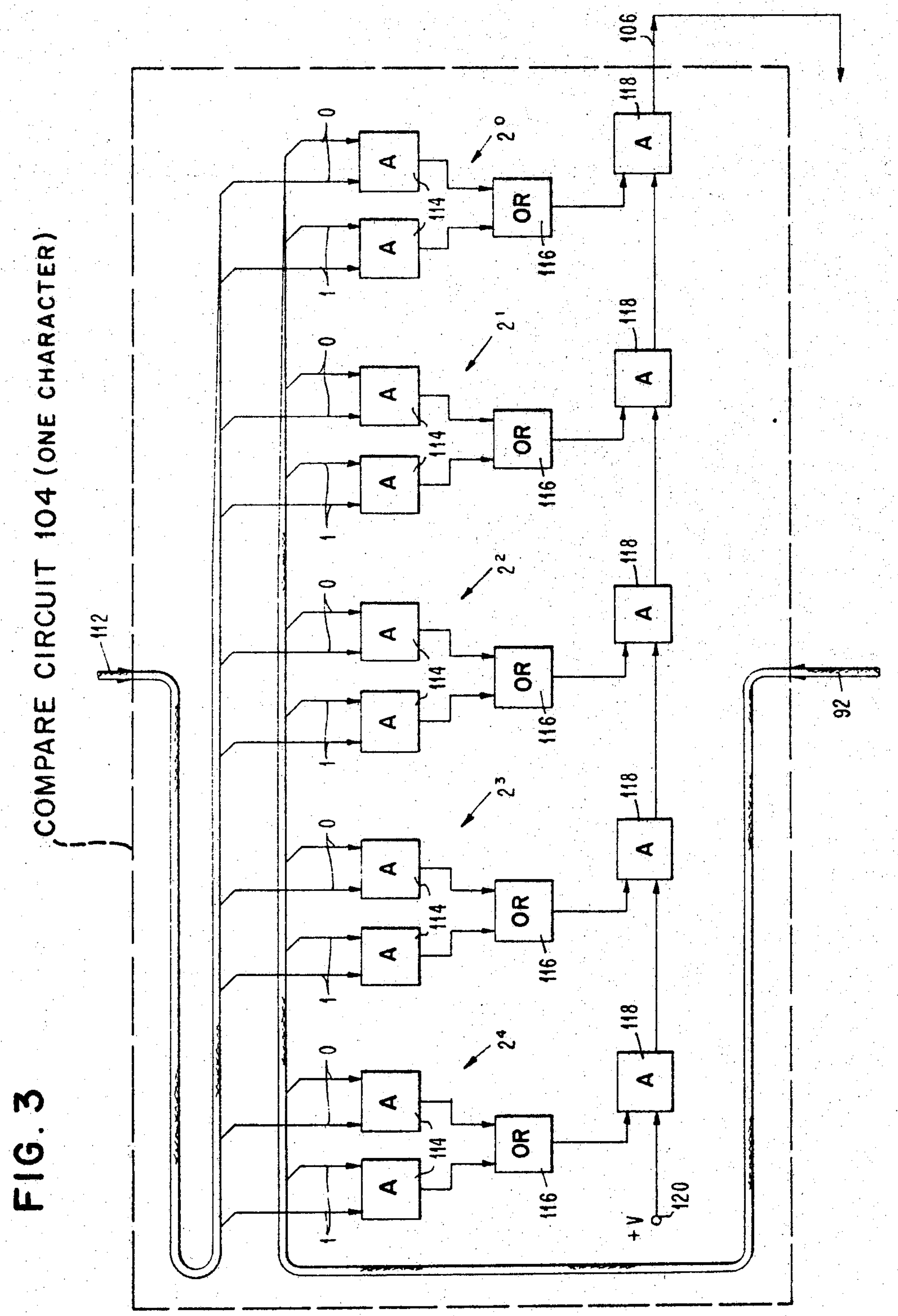

FIG. 3 is a detailed diagram of a circuit shown in block form in FIG. 2.

Referring to FIG. 1, the output of a character recognition machine is entered into an input register circuit 2. The machine is signaled upon completion of word entry and ceases further reading operations until the word is recognized. A control circuit 4 handles all signals that are necessary for the proper timing of the system. The word stored in the input register is then transferred to a coder 6 wherein it is converted into the compact set of code symbols, where each symbol of the coded set corresponds to one or more symbols in the original (conventional) representation. As described above, each original symbol that is not a member of a confusion set is translated into a unique code symbol, but a single code symbol corresponds to all members of a confusion set.

Some confusion sets have been found to be: A and R; D and O; F and P; H and N; and I, L and T, and the following table indicates the code symbols corresponding to each character. The "6-Bit Code," "IBM® Card Code," and "One-in-Twenty Code" data will be described subsequently.

| Alphabetic Character | 6-Bit Code | | | | | | IBM® Card Code | One-In-Twenty Code | Compacted Code |
|---|---|---|---|---|---|---|---|---|---|
| | B | A | 8 | 4 | 2 | 1 | | | |
| A | 1 | 1 | 0 | 0 | 0 | 1 | 12–1 | 1 | 00001 |
| R | 1 | 0 | 1 | 0 | 0 | 1 | 11–9 | | |
| B | 1 | 1 | 0 | 0 | 1 | 0 | 12–2 | 2 | 00010 |
| C | 1 | 1 | 0 | 0 | 1 | 1 | 12–3 | 3 | 00011 |
| D | 1 | 1 | 0 | 1 | 0 | 0 | 12–4 | 4 | 00100 |
| O | 1 | 0 | 0 | 1 | 1 | 0 | 11–6 | | |
| E | 1 | 1 | 0 | 1 | 0 | 1 | 12–5 | 5 | 00101 |
| F | 1 | 1 | 0 | 1 | 1 | 0 | 12–6 | 6 | 00110 |
| P | 1 | 0 | 0 | 1 | 1 | 1 | 11–7 | | |
| G | 1 | 1 | 0 | 1 | 1 | 1 | 12–7 | 7 | 00111 |
| H | 1 | 1 | 1 | 0 | 0 | 0 | 12–8 | 8 | 01000 |
| N | 1 | 0 | 0 | 1 | 0 | 1 | 11–5 | | |
| I | 1 | 1 | 1 | 0 | 0 | 1 | 12–9 | 9 | 01001 |
| L | 1 | 0 | 0 | 0 | 1 | 1 | 11–3 | | |
| T | 0 | 1 | 0 | 0 | 1 | 1 | 0–3 | | |
| J | 1 | 0 | 0 | 0 | 0 | 1 | 11–1 | 10 | 01010 |
| K | 1 | 0 | 0 | 0 | 1 | 0 | 11–2 | 11 | 01011 |
| M | 1 | 0 | 0 | 1 | 0 | 0 | 11–4 | 12 | 01100 |
| Q | 1 | 0 | 1 | 0 | 0 | 0 | 11–8 | 13 | 01101 |
| S | 0 | 1 | 0 | 0 | 1 | 0 | 0–2 | 14 | 01110 |
| U | 0 | 1 | 0 | 1 | 0 | 0 | 0–4 | 15 | 01111 |
| V | 0 | 1 | 0 | 1 | 0 | 1 | 0–5 | 16 | 10000 |
| W | 0 | 1 | 0 | 1 | 1 | 0 | 0–6 | 17 | 10001 |
| X | 0 | 1 | 0 | 1 | 1 | 1 | 0–7 | 18 | 10010 |
| Y | 0 | 1 | 1 | 0 | 0 | 0 | 0–8 | 19 | 10011 |
| Z | 0 | 1 | 1 | 0 | 0 | 1 | 0–9 | 20 | 10100 |
| 0 | 0 | 0 | 1 | 0 | 1 | 0 | 0 | ---------- | ------- |
| 1 | 0 | 0 | 0 | 0 | 0 | 1 | 1 | ---------- | ------- |
| 2 | 0 | 0 | 0 | 0 | 1 | 0 | 2 | ---------- | ------- |
| 3 | 0 | 0 | 0 | 0 | 1 | 1 | 3 | ---------- | ------- |
| 4 | 0 | 0 | 0 | 1 | 0 | 0 | 4 | ---------- | ------- |
| 5 | 0 | 0 | 0 | 1 | 0 | 1 | 5 | ---------- | ------- |
| 6 | 0 | 0 | 0 | 1 | 1 | 0 | 6 | ---------- | ------- |
| 7 | 0 | 0 | 0 | 1 | 1 | 1 | 7 | ---------- | ------- |
| 8 | 0 | 0 | 1 | 0 | 0 | 0 | 8 | ---------- | ------- |
| 9 | 0 | 0 | 1 | 0 | 0 | 1 | 9 | ---------- | ------- |

In FIGURE 1, the output of the coder is applied as the input to a magnetic drum dictionary 8 where the code word is compared to reference words that are stored according to the same compact code. The left-hand symbol of the code word is employed to select a portion of the dictionary (either a section of a drum or one of a plurality of drums). The remainder of the code word is employed to search within the selected portion of the dictionary.

When the searched field of the dictionary corresponds to the applied code word, the reference word or words (in true, uncoded form) corresponding to the code word are read out of the dictionary to an output register circuit 10. This register contains several fields, each large enough to hold a maximum length word. When only one true word corresponds to the code word (as in the above example for THINK) only one word is applied to the output register circuit and the bulk of the register is empty. When two or more words correspond to the code word (as in the above example SHOW and SNOW) all corresponding words are placed in the output register. At this time, the control circuit causes the uncoded data in the first field (word) of the output register to be applied through a zero detector 12 to a compare circuit 14. The uncoded word in the input register 2 is compared, letter by letter, with the first word in the output register and, if a perfect match is obtained, a signal is applied through the control circuit to condition an "and" gate 16 which, in turn, passes this word to an output device 17 through an "or" gate 18. If a perfect match is not obtained, the operation is repeated on the words stored in the remaining fields of the output register (one word at a time). When all words have been compared without obtaining a perfect match, a signal is applied to the control circuit from the zero detector 12 and all words stored in the output register are applied to the output device. In the more common case, only one word is present in the output register and, hence, only one word is applied to the output device. In the unusual condition, two or more words are applied to the output device. This only occurs when letters in two or more confusion sets are present in the same word and no reference word exactly matches the word in the input register. As an example of this condition (using the above table) if the character recognition machine reads the word ARID as RRID, the code symbol sequence 00001, 00001, 01001, 00100 is generated. The dictionary indicates two choices: ARID and RAID, and neither exactly matches RRID. In this case, both ARID and RAID would be applied to the output device and the correct word would be selected by the user.

When the input register contains numerical data, the entire operation is bypassed as the control unit conditions an "and" gate 20 which applies the numerical data directly to the output device through "or" gate 18.

The operation of the system is explained in detail with respect to specific examples of the various types of situations which can exist.

The first specific example concerns the non-ambiguous case as exemplified by the word DIG which is coded as: 00100, 01001, 00111. All other character combinations with this code representation are invalid words, namely: DLG, DTG, OIG, OLG and OTG. In this first example, the dictionary stores only the word DIG at the address specified by 00100, 01001, 00111 and, since this word exactly matches the input word, it is applied to the output device.

The second example concerns the case wherein the character recognition machine generates a letter sequence which exactly matches the first of several dictionary-stored possibilities. In this example, the word FILL is provided by the character recognition machine and its generated code is: 00110, 01001, 01001, 01001. Of the dozens of letter sequences which correspond to this code, only FILL and PILL are valid words and the dictionary contains these two words, in alphabetical order at the specified address. Since the first of the stored words matches the input word, it is the only word which must be compared before supplying it to the output device.

The third example is similar to the second example, except that the second of the stored words exactly matches the sequence generated by the character recognition machine (PILL in the above example). In this case, the first comparison indicates a mismatch and two comparisons are required.

The fourth example is similar to the second and third example, except that the output of the recognition system (FLLL) does not exactly match either stored word (FILL and PILL). In this example, both comparisons fail so both stored words are applied to the output device.

In the fifth example, numeric data is provided by the character recognition system and the dictionary, comparison circuit, etc., are not required as the numeric data is applied directly to the output device.

SPECIFIC EXAMPLE 1

In this example, the character recognition machine correctly reads the word DIG and enters this word into the input register 2 circuit (FIG. 1).

Referring to FIGURE 1, the word (DIG) is applied from register 2 to coder 6 where it is translated into the compact code (00100, 01001, 00111). In the preferred embodiment, twenty magnetic drums are used in the dictionary, where each drum contains all code words (and their translations) that begin with one of the twenty code symbols. That is, drum 1 contains all words beginning with A or R (code 00001), drum 2 contains all words beginning with B (code word 00010), etc. In the present example, the first code symbol (00100) is employed to select the number 4 drum unit in the dictionary. The remainder of the code symbols (01001, 00111) is employed to address the data stored on this selected drum. When this address is located, the single valid word DIG is accessible and this word is placed in the output register 10. This word is the only valid one which corresponds to the compact code. The word DIG is then transferred from register 10 to the output device. Upon completion of the transfer, the character recognition machine is signaled to read the next word. A character recognition machine that is suitable for use with the present invention is described in copending application Ser. No. 79,900 filed Dec. 30, 1960 by John P. Lazarus.

Referring to the detailed diagrams of FIGURE 2, several bistable devices are used and referred to as "flip-flops." They are designated by double blocks and the letters "FF." Before proceeding with a description of the operation of the system, the initial status of these devices is examined.

A switch 22 (FIG. 2*d*) is momentarily depressed prior to operation. This switch provides a reset signal to several of the flip-flops as follows: through "or" gate 24 to place flip-flop 26 in its left status; through "or" gate 28 to place flip-flops 30 and 32 in their left status; through "or" gates 34 and 36 to place flip-flop 38 in its left status: and through "or" gates 34 and 40 to place flip-flops 42 and 44 in their right status. In addition, this signal is applied through "or" gates 34, 40 and 46 to reset ring counters 48 (FIG. 2*d*) and 49 (FIG. 2*h*) to provide outputs on their "1" leads.

When the output device completes recording a word a "readout complete" signal is applied through "or" gate 28 (FIG. 2*d*), "and" gate 50 and "or" gate 36 to place flip-flop 38 in its left status. (In the initial cycle of operation this effect is accomplished by switch 22 as described above.) A "read in" signal is generated on line 52 which is applied as the "punch done" signal to the Lazarus machine (Lazarus FIG. 12II). This signal initiates operation of the character recognition machine to read the next word, character-by-character.

In the example, the first character read by the Lazarus machine is a D and a signal is provided at the output of this machine (Lazarus FIG. 12II). This signal is applied on a lead 54 (FIG. 2*a*) and is entered in the "character 1" field of a register 56. The placement is effected by a ring counter 58, which is previously reset by a "space" signal from the Lazarus machine (Lazarus FIG. 12II) and provides a signal at its "1" output on line 60 to condition a multiple "and" gate 62 (comprising a group of conventional "and" gates, each conditioned by a common signal). These gates pass the signals from a group of "or" gates 64, which effect a code conversion to a six-bit code 11 according to the above table. Since a D is read, signals are provided by those "or" gates corresponding to B, A, $\bar{8}$, 4, $\bar{2}$, and $\bar{1}$, causing 110100 to be entered in the character 1 field of a register 56. The use of a true and complementary bit structure makes it unnecessary to reset register 56 prior to entry of a word.

Shortly after the entry of D into this apparatus, the Lazarus machine produces an "end of character" signal ($X_c$)" Lazarus FIG. 12V) which shifts the ring counter 58 to position 2, conditioning multiple "AND" gate 66 to direct the next character to the second position of register 56. The Lazarus machine proceeds to read the succeeding characters I and G which are translated to the six-bit code and are entered into the second and third positions of register 56. After the character G is read, the Lazarus machine generates a "space" signal (Lazarus FIG. 12II), which is applied to reset the ring counter 58 to its "1" position in preparation for the next input word. This signal from the Lazarus machine is also applied as the "read in complete" signal to place flip-flop 38 in its right status.

Figure 2A:
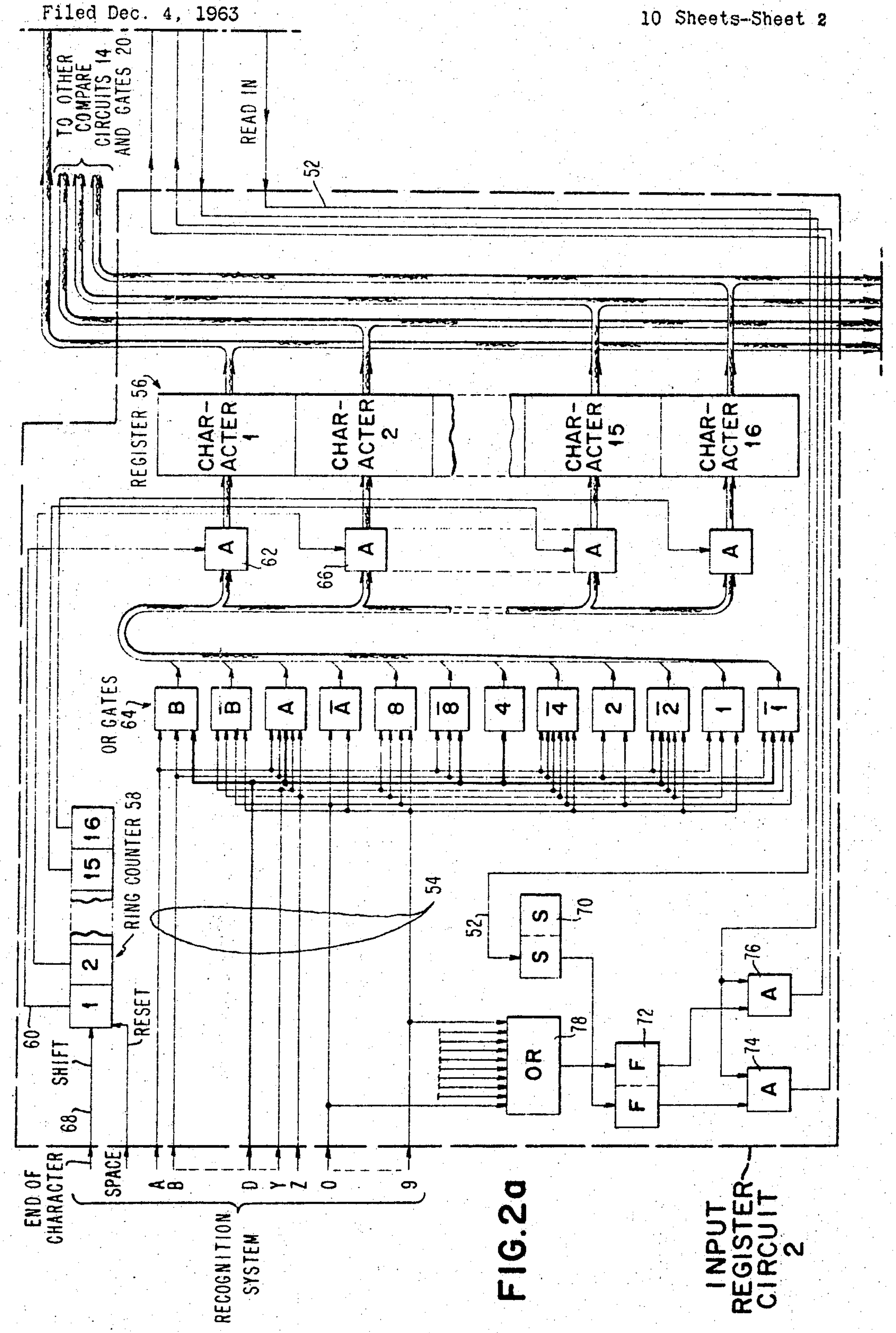

While the characters are being entered from the Lazarus machine into register 56 (FIG. 2*a*) a determination of the type of character is made. If the word is wholly alphabetic, the dictionary and associated circuits are used, but if any character is numeric, these circuits are bypassed and the input word is applied directly to the output device. The original setting of flip-flop 38 (FIG. 2*d*) to its left status provides a read in signal to a single shot multivibrator (SS) circuit 70 (FIG. 2*a*) which generates a pulse. This pulse places a flip-flop 72 in its left status, conditioning an "and" gate 74 and blocking another "and" gate 76. When any character in the input "word" is numeric, an "or" gate 78 provides a signal which places flip-flop 72 in its right status, reversing the signals to "and" gates 74 and 76 (blocking "and" gate 74 and conditioning "and" gate 76). As described above, when the input word is completely read into register 56 (FIG. 2*a*) flip-flop 38 (FIG. 2*d*) is placed in its right status. This generates a signal which triggers a single shot 80 which in turn, provides an output pulse to "and" gates 74 and 76 (FIG. 2*a*). When the entered word is totally alphabetic, the pulse is passed by "and" gate 74; if any character is numeric, the pulse is passed by "and" gate 76. The output of these "and" gates control the status of a flip-flop 82; right status for alphabetic; left status for numeric. In the present example, alphabetic data is applied and the flip-flop provides an output from its right side to which is connected to a pulse by a capacitor 84 (FIG. 2*e*) and applied to a flip-flop 86 placing it in its left status. The function of this circuit will be described subsequently.

Figure 2B:
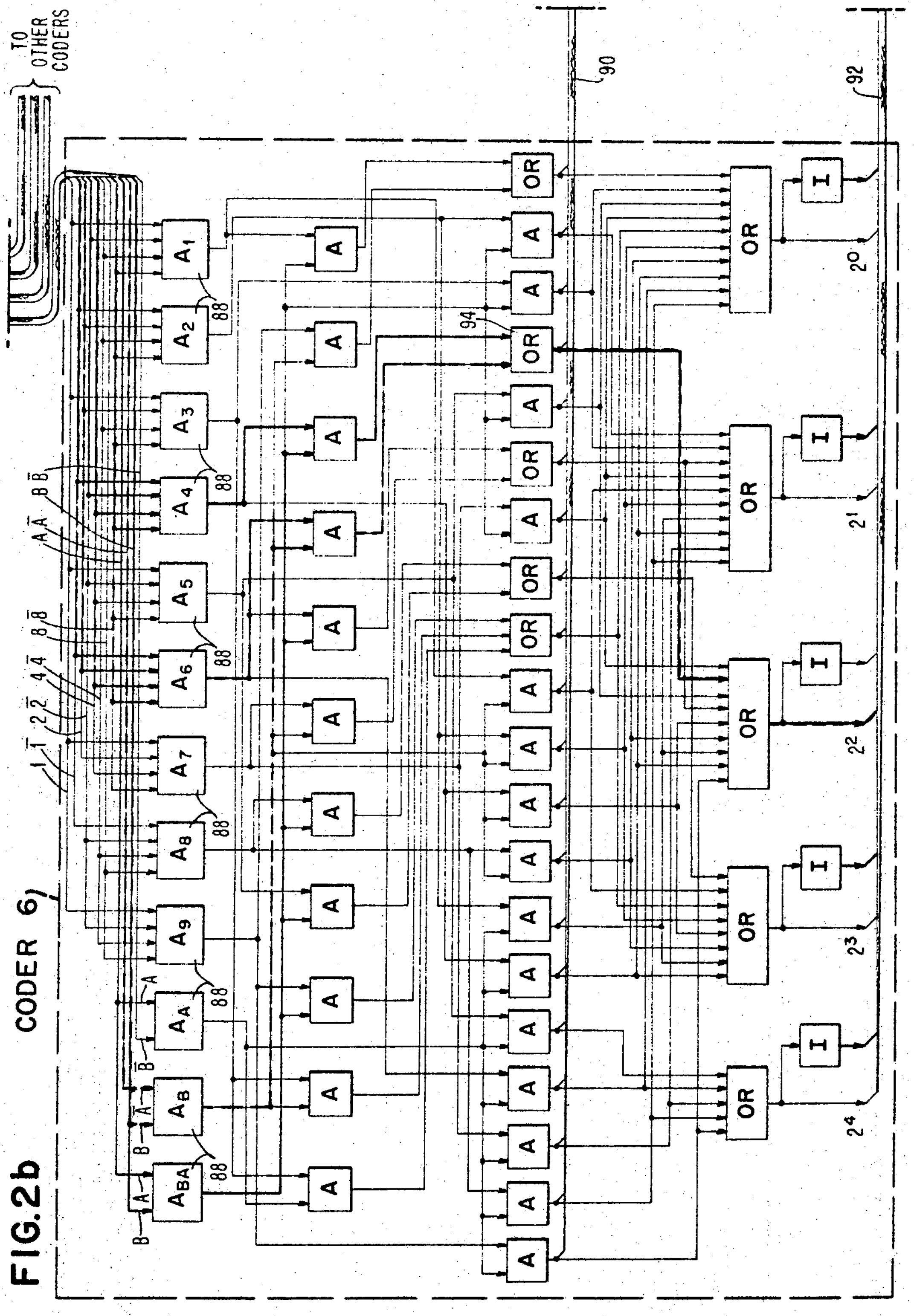

As each character appears in input register 56 (FIG. 2*a*), it is translated into the compact code by coder 6 (FIG. 2*b*). The six-bit code in register 56 is first converted to the IBM® card code, then to a one-in-twenty code, and then to the five-bit compact binary code. The above table shows the correspondence between the various notations. Twenty symbols of the compact code are sufficient to represent the twenty-six alphabetic character because the confusion sets are transformed into single symbols in the compact code.

A coder is associated with each field of register 56. One such coder is shown in FIGURE 2*b* and is connected to the "character 1" field. Since this portion of the register contains a D in this example, it is translated to 00100 by the coder with signal paths as indicated by the heavy lines in FIG. 2*b*. The above table shows that, in the compacted code, both D and O are represented by 00100. If the machine had read O instead of D, the O would control the coder as indicated by the dashed, heavy lines. The coder is comprised of a number of conventional passive logic circuits ("and" gates, "or" gates and inverters, shown by symbols A, OR and I, respectively).

The leads from the upper layer of "and" gates 88 contain signals describing the character in the IBM® card code, the signals on the leads in cable 90 describe the character in a one-in-twenty code and the signals on the leads in cable 92 describe the character in the compact code. Note that the signal paths (heavy lines and dashed lines) converge at the output of "or" gate 94 (in the one-in-twenty code) and that a signal of 00100 for both D and O appears at the output of the coder. Similar coders, corresponding to the second and third positions of register 56 (FIG. 2*a*) produce the codes 01001 and 00111, respectively, for I and G when they are entered in the register.

Figure 2C:
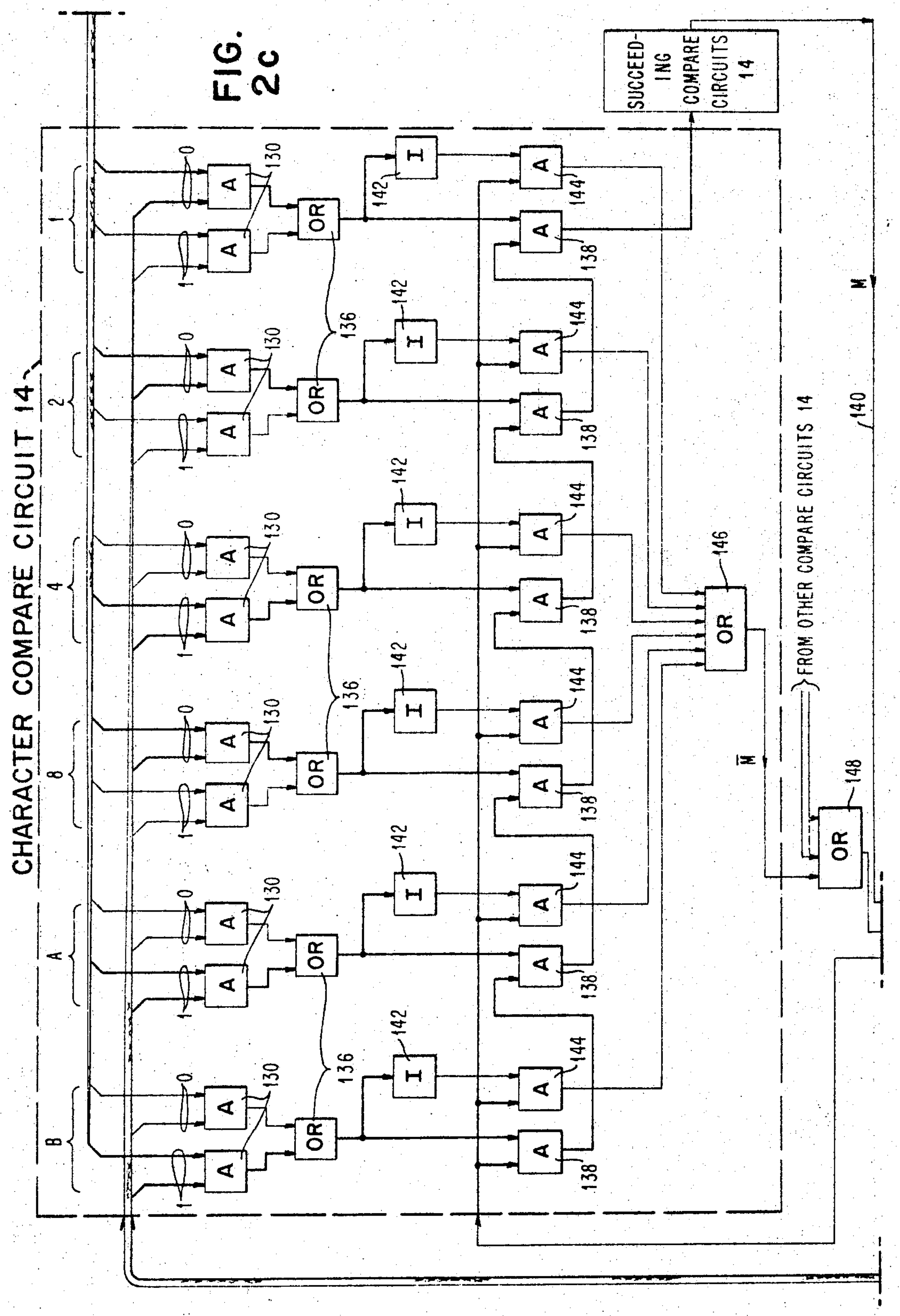
Figure 2E:
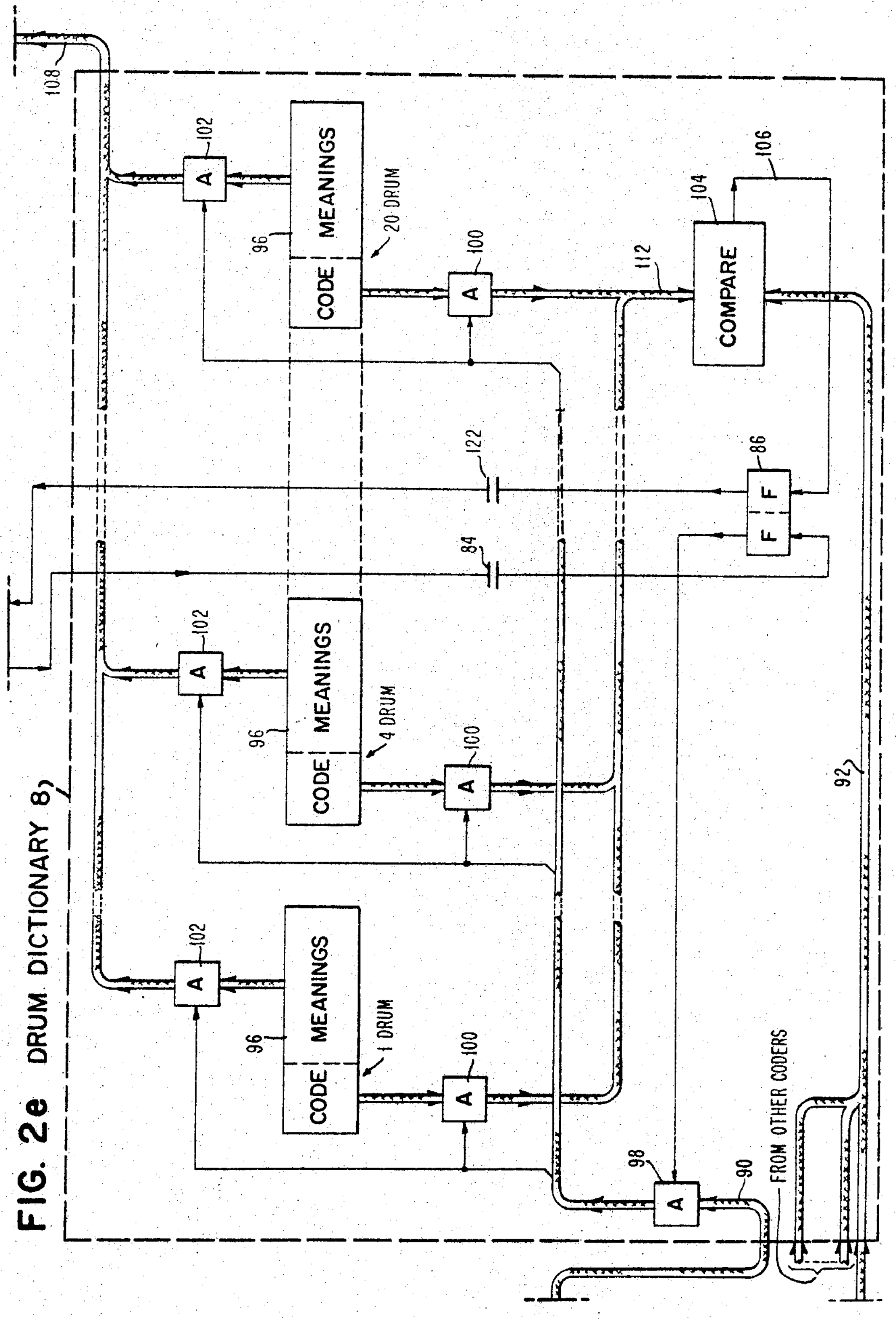
Figure 2F:
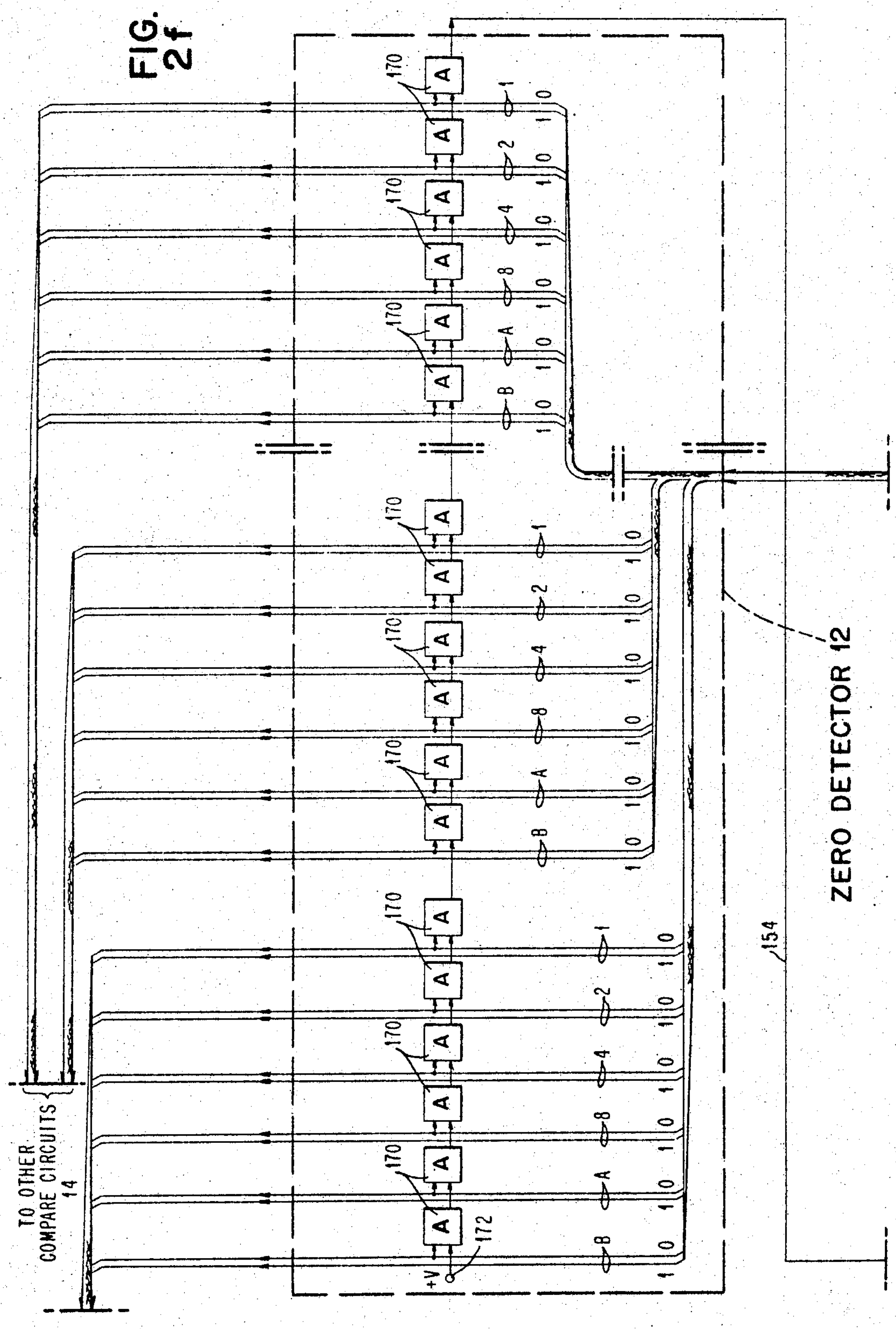
Figure 2G:
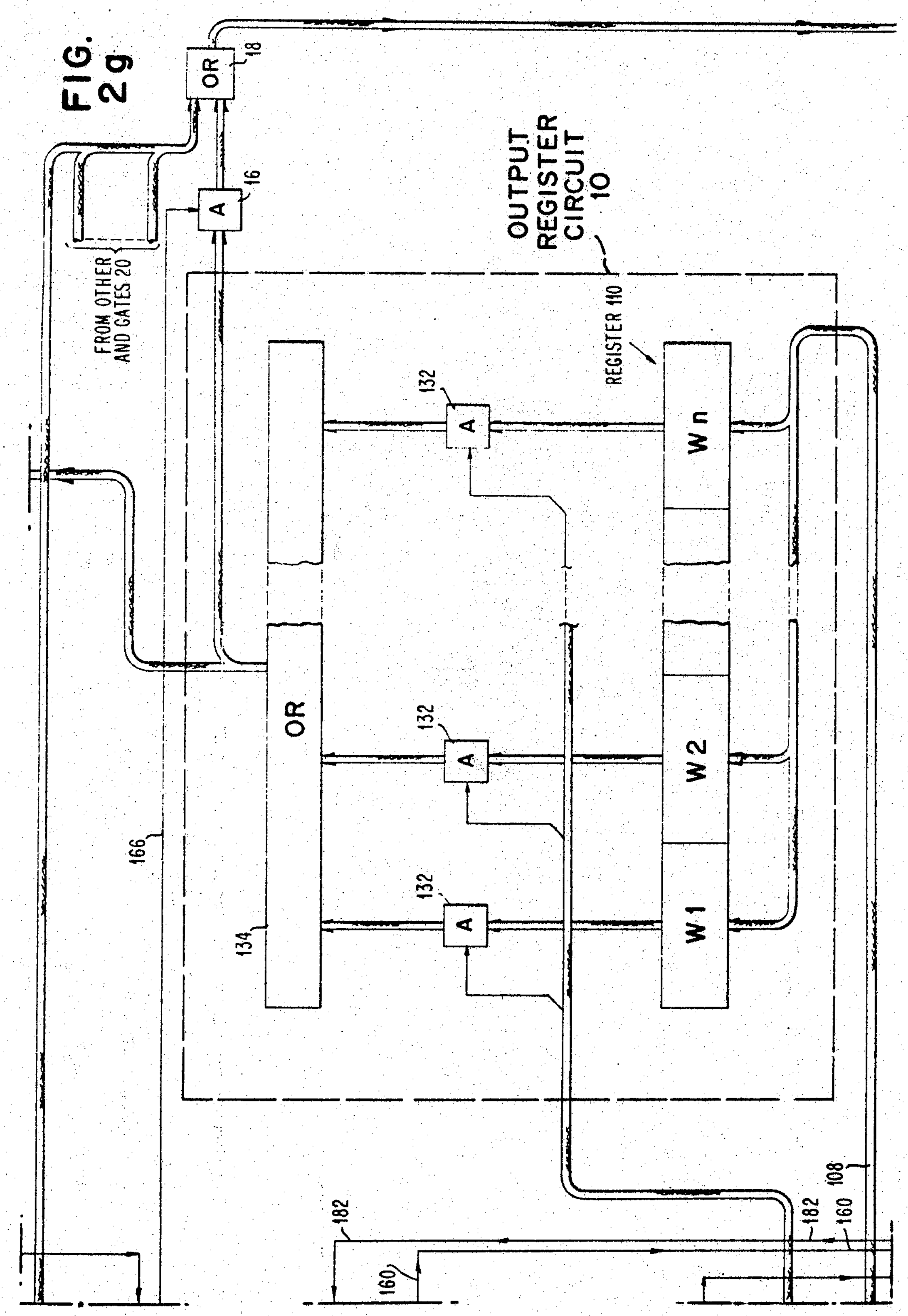

With DIG in input register 56 and the coded representations of DIG at the outputs of coders 6 (FIG. 2*b*), the apparatus is ready to interrogate the drum dictionary 8 (FIG. 2*e*) to search for and secure the corresponding valid word or words. To effect this, one of twenty drums 96 is selected based on the first symbol of the code word. The output of the one-in-twenty coder (in this instance "4") is applied via cable 90 to a multiple "and" gate 98 (FIG. 2*e*). That is a signal is present on the fourth lead of the twenty leads in cable 90. The "and" gate is conditioned by a signal from flip-flop 86 which is in its left status, as described above. The "and" gate 98 passes the input on cable 90 to control multiple "and" gates 100 and 102. Only gates 100 and 102 that are associated with the 4 drum are conditioned. This drum is now addressed (searched) by the remaining code symbols (01001 and 00111). The entries on each drum may be arranged in any order, including a random arrangement. The data from the remaining fifteen coders 6 (of the type shown in FIG. 2*b*) corresponding to the second through sixteenth characters of the input word are applied to a compare circuit 104 (FIG. 2*e*) via cable 92. The compare circuit is described in detail with respect to FIG. 3, subsequently. Since the word DIG contains only three characters, the coders corresponding to the fourth through sixteenth characters provide zero outputs to the compare circuit. Although a complete coder is shown in FIG. 2*b*, the coder for characters 1 of the input word supplies useful data only on cable 90 to select the correct drum and the coders for characters 2 through 16 supply useful data only on cable 92 for comparison purposes. The unnecessary cables and circuits can be eliminated. The other input to the compare circuit 104 receives the code symbols for the second through sixteenth characters of the code words on drum 4 which contains all code symbol sequences for the valid words commencing with D and O except for the first code symbol (which has been used to locate the drum). Each full drum word includes, in addition to the code symbol sequences, all corresponding valid words. Only the code symbol filed is applied to compare circuit 104. As the drum is rotated to the correct position, identical data is applied to both inputs of the compare circuit and a signal is generated on lead 106. This signal places flip-flop 86 in its right status, removing the conditioning signal to "and" gates 98 and, hence, blocking "and" gates 100 and 102. While the code field is being compared, the remaining fields containing the valid words are applied through "and" gates 102 and cable 108 to register 110 (FIG. 2*g*). True and complementary bits in six-bit code are applied in parallel to avoid the necessity of resetting the register. In the example, when the apparatus determines a match for code symbols 01001 and 00111, the word DIG is placed in register 110. Only this single word is applied to register 110 because it is the only valid word corresponding to the code designation.

The compare circuit 104 (FIG. 2*e*) is shown in detail in FIG. 3 for a single character. Fifteen such circuits are required for the 16-character words in the preferred embodiment—one circuit for each character other than the first character which is only used to select a drum. Each corresponding data element in cables 92 and 112 are applied to an "and" gate 114 (in true and complementary form). When the corresponding data elements match, "and" gate 114 provides outputs which are passed by "or" gates 116 to condition another group of "and" gates 118. A signal from a source 120 is passed by all "and" gates 118 only when an exact match between characters is present. The match indication on lead 106 is applied to the successive compare circuit 104 in place of source 120, such that all compare circuits are arranged on tandem and an output is present from the last of the series (on lead 106) only when each character on cable 92 exactly matches the corresponding character on cable 112.

The apparatus now compares (on an alphabetical basis) the word in register 110 (FIG. 2*g*) and the word in input register 56 (FIG. 2*a*). The signal provided by flip-flop 86 (FIG. 2*e*) when a match is indicated by compare circuit 104 is applied through a capacitor 122 (which converts the signal to a pulse) to place a flip-flop 42 (FIG. 2*d*) in its left status. The signal from flip-flop 42 conditions a pulse generator 124 which provides a series of interspersed timing pulses at its A and B output leads where the first pulse provided is an A pulse. The pulses are applied to "and" gates 126 and 128 which are controlled by flip-flops 26 and 30, respectively. Both of these flip-flops are initially reset by switch 22 as described above. The first A pulse is applied to each of a group of sixteen character compare circuits 14 (one of which is shown in FIG. 2*c*). A character of the input word in register 56 (FIG. 2*a*) is compared to the corresponding character of a valid word in register 110 (FIG. 2*g*) in each compare unit. In the present example, the character D (in 6-bit code) is applied from the character 1 field of register 56 (FIG. 2*a*) to a group of "and" gates 130 in the compare circuit 14 (FIG. 2*c*). Simultaneously, the first character in the first word (W–1) in register 110 (FIG. 2*g*) is passed by a multiple "and" gate 132 and an "or" gate 134, through the zero detector circuit 12 (FIG. 2*f*), to "and" gates 130 (FIG. 2*c*). Word 1 is initially selected from register 110 (FIG. 2*g*) because its corresponding "and" gate 132 is conditioned by a signal from the "1" output of ring counter 48 (FIG. 2*d*). The "and" gates 132 (FIG. 2*g*) corresponding to words 2 through N are not conditioned during this first comparison cycle. The heavy lines in FIG. 2*c* indicate the signal paths when two D's are compared, as in the present example. When identical data is applied to the comparison circuit, a signal is present at the output of each of a group of "or" gates 136 to condition a group of "and" gates 138. The A pulse passes through this series of "and" gates and produces the "M" (match) signal on a lead 140. When the characters do not match, a signal is generated by one or more of a group of inverters 142 and passed by a corresponding "and" gate 144 to an "or" gate 146. Since each character in the input word is compared to each character in the stored words, the "match" signal on lead 140 is applied (instead of the A pulse) to the remaining comparison circuits, which are arranged in tandem. When both applied words match exactly, a signal is present on lead 140 (M). When a mismatch is indicated by a signal from any "or" gate 146, a mismatch signal (M) is provided by an "or" gate 148 (FIG. 2*d*).

In this first example of a perfect match with the first (and only) word stored in the dictionary for the corresponding compact code sequence, the match signal on lead 140 (FIG. 2*d*) is applied through an "or" gate 150 to an "and" gate 152. When the zero detector 12 (FIG. 2*f*), provides no signal on lead 154, indicating that there is a word stored in the sensed field of register 110 (FIG. 2*g*), an inverter 156 (FIG. 2*d*) provides an output signal to condition "and" gate 152. This is always the case during the first compare cycle as there must be at least one word stored in register 110 (FIG. 2*g*). The zero detector will be described in greater detail with respect to Example 4.

Figure 2H:
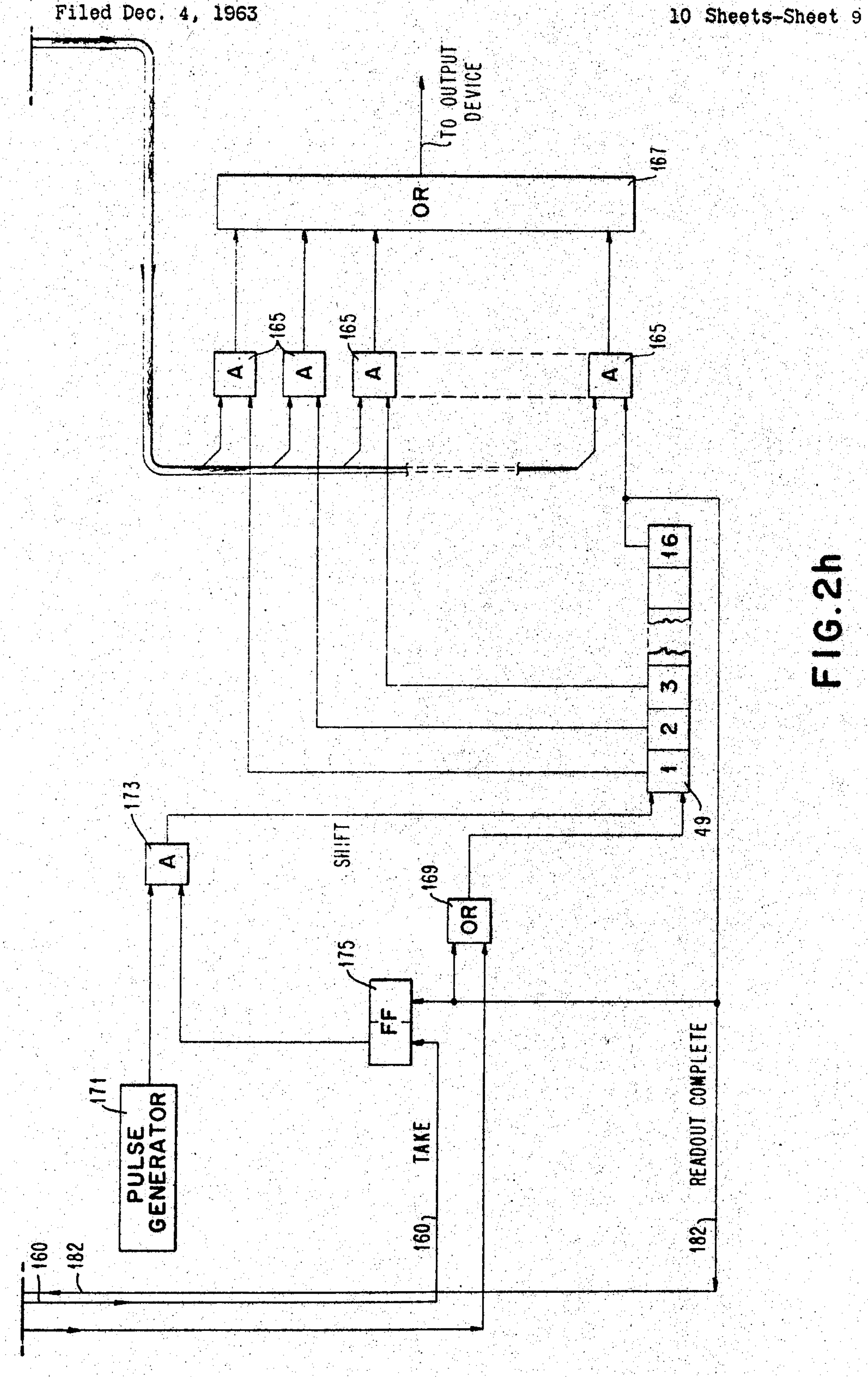

When conditioned, "and" gate 152 passes the match signal from "or" gate 150 to an "or" gate 158 which, in turn, generates the "take" signal which is applied on a lead 160 to the circuits in FIG. 2*h*. This signal indicates that the system is prepared to transmit a word to the output device. The signal from "and" gate 152 is also applied to set a flip-flop 32 to its right status. The output generated by this flip-flop conditions a gate 16 (FIG. 2*g*) which passes the selected word from register 110 through an "or" gate 18 to the output device.

The signal from "and" gate 152 is also applied to reset flip-flops 26 and 30 to their right side to block successive A and B pulses until the output device has taken the applied word. At that time, a "readout complete" signal is applied from the circuits in FIG. 2*h* through "or" gate 28 to reset flip-flops 30 and 32 to their left status, and through "and" gate 50 (conditioned, by flip-flop 44) and "or" gate 36 to reset flip-flop 38 to its left status.

The first B pulse to occur after the "readout complete" signal is passed by "and" gate 128 and "or" gate 24 to place flip-flop 26 in its left status. This B pulse is also applied to an "and" gate 162. The previous match (M) signal on lead 140 (described above) also places a flip-flop 164 in its right status to provide a signal to condition "and" gate 162. Thus, "and" gate 162 passes the B pulse through "or" gate 40 to reset flip-flop 42, and through "or" gates 40 and 46 to reset ring counter 48 to its "1" position. Thus, all circuits are reset in preparation for the next word from the character recognition machine.

The readout circuits are shown in detail in FIG. 2*h*. Each character in the selected word from the output register is applied from "or" gate 18 (FIG. 2*g*) to an "and" gate 165 (FIG. 2*h*). The characters are sequentially sampled by outputs of ring counter 49 and applied through an "or" gate 167 to a magnetic tape unit which is used as the output device in the preferred embodiment. The ring counter is initially reset by a signal through an "or" gate 169 from "or" gate 46 (FIG. 2*d*) as described above. As the last character in each word is sampled, the output of the ring counter (section "16") is applied through "or" gate 169 to reset the counter. This signal is also applied to "or" gate 28 (FIG. 2*d*) on a lead 182 as the "readout complete" signal. The shift pulses to the ring counter 49 (FIG. 2*h*) are supplied by a pulse generator 171 through an "and" gate 173 under the control of a flip-flop 175. The flip-flop is set to its left status by the "take" signal which occurs on lead 160 when the output device is to accept a word. The flip-flop is reset by the "readout complete" signal (FIG. 2*h*) after the word has been applied to the output device. Thus, "and" gate 173 passes shift pulses at the appropriate time to shift ring counter 49 through one cycle of operation when a word is to be read out to the output device.

SPECIFIC EXAMPLE 2

In this example, the operation of the system is analyzed when the character recognition machine accurately recognizes a letter sequence that exactly matches the first of two valid words that are stored in the drum dictionary. In this example, the word FILL is converted to the code symbol sequence 00110, 01001, 01001, 01001 (from the above table). The first symbol (00110) selects drum 6 and the succeeding symbols address this drum. In the example, two valid words, FILL and PILL, are stored at the selected address. The system causes FILL to be compared with the applied sequence and a perfect match is obtained. Therefore, the word FILL is applied to the output device. In this example, the system operation is the same as that described for Example 1, except that two words are transferred from the drum dictionary to the output register. However, since the first word provides a perfect match, the second word has no effect on the system operation.

SPECIFIC EXAMPLE 3

This example is an extension of Example 2. In the present example, the word PILL is accurately provided by the character recognition machine. The system operates in accordance with the description in Example 1 until the applied word (PILL) is compared to the first stored word (FILL) and a mismatch is indicated by a signal on the $\overline{M}$ lead 88 from the character compare circuits 14 (FIG. 2*c*). In this case, the match (M) signal is absent on load 140 and consequently "and" gate 152 is blocked. This prevents the application of the first stored word (FILL) to the output device because flip-flop 32 remains in its left status and no conditioning signal is present on its output lead 166 to "and" gates 16 (FIG. 2*g*).

The mismatch signal ($\overline{M}$) sets flip-flop 164 to its left status to provide a conditioning signal for an "and" gate 168 which causes the subsequent B pulse from "and" gate 128 to shift the ring counter 48 to its second position. Thus, when the first word (W–1) in register 110 (FIG. 2*g*) does not match the data in register 56 (FIG. 2*a*), the second word (W–2, in register 110 is applied to the character compare circuit 14 (FIG. 2*c*). In the present example, the second word (PILL) exactly matches the input data and the next A pulse provides a match (M) signal on lead 140. This signal is applied through "or" gate 150 and "and" gate 152 to control flip-flop 32 such that the second word in register 110 (FIG. 2*g*) is read out to the output device.

SPECIFIC EXAMPLE 4

This example is an extension of Examples 2 and 3, but the character recognition machine is now presumed to have generated the invalid sequence FLLL. The system functions in the manner described in Example 3, except that neither the first nor second words (FILL and PILL) in register 110 (FIG. 2*g*) match the input sequence. In this case, the system applies both FILL and PILL to the output device. In the present example, mismatch ($\overline{M}$) signals are generated by the character compare circuit 14 (FIG. 2*c*) when the first and second words stored in register 110 (FIG. 2*g*) are applied. Each of these mismatch signals shift ring counter 48 (FIG. 2*d*), placing it in its third position, and the data in the third field of register 110 (FIG. 2*g*) is passed to the character compare circuit 14 (FIG. 2*c*). However, since there are only two valid words in the drum dictionary, the third field (W–3) in register 110 (FIG. 2*g*) is empty. The zero detector 12 (FIG. 2*f*) senses this condition and generates a signal on lead 154. The zero detector contains sixteen sections, one for each character in the maximum length word. Each section, of which three are shown in FIG. 2*f*, contains six "and" gates 170, where each is responsive to a "0" bit in the applied 6-bit word. A signal is propagated from a source through all "and" gates 170 when all are conditioned by "0" bits. When any bit in the applied word is not "0," this signal is blocked. Thus, a signal appears on output lead 154 only when the word applied to the zero detector contains all zeroes (that is, the word is non-existent).

The signal that is provided on lead 154 by the zero detector when the third field of register 110 (FIG. 2*g*) is interrogated (in the present example, where only two fields of register 110 contain words), is applied through inverter 156 (FIG. 2*d*) to block "and" gate 152. This signal is also applied to condition two "and" gates 174 and 176. The first A pulse to occur after the ring counter 48 is shifted to its third position (which occurred at a B pulse time), is also applied to "and" gate 174. However, the third input to this "and" gate (from the left side of flip-flop 44) is not present and the gate remains blocked. The next B pulse is applied to "and" gate 176 (which has been conditioned) and an output signal is generated which sets flip-flop 44 to its left status. The resulting output generated by this flip-flop conditions "and" gate 178 such that successive A pulses are passed to "or" gate 150. These A pulses replace the match signals to "or" gate 150 to enable the readout of words from register 110 (FIG. 2*g*) to the output device even though these words do not match the applied word. The output from the left side of flip-flop 44 (FIG. 2*d*) is also converted to a pulse by a capacitor 180 and applied through "or" gate 46 to reset ring counter 48 to its first position. The system is now prepared to transmit all words stored in register 110 (FIG. 2*g*) to the output device because no word exactly matches the applied word in register 56 (FIG. 2*a*).

The next A pulse causes the first word in register 110 (FIG. 2*g*) to be applied to the output device, as "and" gate 152 (FIG. 2*d*) is conditioned by the absence of a zero detector output at this time. The output of "and" gate 152 also sets flip-flops 26, 30 and 32 to the right status to block the passage of A and B pulses through "and" gates 126 and 128 while the first word in register 110 (FIG. 2*g*) is being applied to the output device. At the termination of this operation, the "readout complete" signal on lead 182 (FIG. 2*d*) sets flip-flops 30 and 32 to their left status (without affecting flip-flops 26). The following B pulse from pulse generator 124 is passed by "and" gate 128 and "and" gate 168 (which is conditioned by the signal from the left side of flip-flop 164 due to the mismatch condition) to shift ring counter 48 to the second position. This B pulse is also applied through "or" gate 24 to set flip-flop 26 to its left status to permit the subsequent A pulse to be passed by "and" gate 126 and applied through "and" gate 178, and then through "or" gate 150, to initiate the readout of the second word in register 110 (FIG. 2*g*) to the output device.

This cycle is repeated until all words in register 110 (FIG. 2*g*) have been applied to the output device. In the present example, two words (FILL and PILL) are applied to the output device. After all valid words have been read out, the zero detector 12 (FIG. 2*f*) generates a signal on lead 154 to block "and" gate 152 (FIG. 2*d*). This signal is also applied to "and" gate 174 (which is conditioned by flip-flop 44) which passes the next B pulse to reset the system. The output of "and" gate 174 resets: flip-flop 38 (through "or" gates 34 and 36); ring counter 48 (through "or" gates 34, 40 and 46); and flip-flops 42 and 44 (through "or" gates 34 and 40). The resetting of flip-flop 42 inhibits the operation of pulse generator 124. Flip-flops 30 and 32 were previously set to their left status by the most recent "readout complete" signal and the succeeding B pulse had set flip-flop 26 to its left status.

This system can obviously be modified to select one of the valid words based on various decision criteria. As a simple example, the valid word having the highest number of matching characters can be selected. In example 4, the input FLLL matches FILL with only one character in error, while matching PILL with two characters in error. Hence, FILL can be selected as the best match as, in effect, the ILL in FILL and PILL add nothing to the discrimination; only the first character is informative. The system can be modified to make this decision by either counting mismatches or by storing nondiscriminating characters (ILL in the example) with a "don't care" symbol such that the character compare circuit does not indicate a mismatch when a "don't care" symbol is applied. That is, the "don't care" signals can be used to bypass the corresponding character compare units completely and to indicate a match.

The system, even with these obvious extensions, is incapable of recognizing an input sequence such as RRID among the valid words ARID and RAID, as each valid word differs from the input sequence by one character and the character is not in the "don't care" class. Further obvious extensions can be made to enable the system to make a selection. The character recognition machine can provide stability (or probability) data indicating the difficulty encountered in recognizing the characters and these probabilities can be multiplied, where the highest product indicates the best word. For example, the character reader may indicate that, in the sequence RRID, the probability of the first character being an R is .5 and the probability of it being an A is .35 (close decision), while the probability of the second character being an R is .8 and the probability of it being an A is .1 (pronounced distinction). In this case, the probability of the sequence RRID corresponding to ARID is high ($.35\times.8$) and the probability for RAID is low ($.5\times.1$), resulting in the selection of ARID for application to the output device. Another probability that can be used is related to the frequency of occurrence of the various characters in the language. If A is more likely to occur than R, close decisions by the character recognition machine can be swayed in the direction of A. That is, with the above probabilities, the first character can be accurately read as an A, without introducing an error in reading the second character, by selecting A rather than R whenever the ratio of discrimination is less than a constant (e.g. 2). In addition, the dictionary can store the relative probability of occurrence of the valid words. For example, if the word ARID occurs in the language more often than the word RAID, ARID can be selected when ambiguity exists. Obviously, any combination of the above criteria can be used to provide enhanced word recognition.

If desired, all words can be supplied to the output device along with an indication of the most probable word.

SPECIFIC EXAMPLE 5

In this example, the effect of numeric or alphanumeric "words" in the system operation is described.

Before a word is read in from the character recognition machine, flip-flop 72 (FIG. 2*a*) is set to its left status as described above in Example 1. When any "character" in the word being read in is numeric, a signal is passed through "or" gate 78 to set the flip-flop to its right status, causing "and" gate 76 to be conditioned. After the entire word is read in, the "read in complete" signal 184 (FIG. 2*d*) sets flip-flop 38 to its right status, generating a signal which is converted into a pulse by single shot 80. This pulse is passed by "and" gate 76 (FIG. 2*a*) to set flip-flop 82 (FIG. 2*d*) to its left status. This action inhibits the operation of the dictionary and conditions a group of multiple "and" gates 20, one of which is shown in FIG. 2*d*. These gates pass the "word" in register 56 (FIG. 2*a*) directly to "or" gate 18 (FIG. 2*g*) and, then, to the output device. The pulse passed by "and" gate 76 (FIG. 2*a*) is also passed through "or" gate 158 (FIG. 2*d*) as the "take" signal to the output device.

SUMMARY

A system is shown and described which makes use of the redundancy in an input sequence to compensate for errors. The system is particularly shown and described with respect to the recognition of printed or written words.

While the invention has been particularly shown and described with reference to a preferred embodiment thereof, it will be understood by those skilled in the art that various changes in form and details may be made therein without departing from the spirit and scope of the invention.

What is claimed is:

1. An apparatus for identifying an applied sequence of symbols having a redundant notation comprising, in combination:

means for converting the applied sequence into a second sequence where the second sequence is described by a notation that is less redundant than the notation which describes the applied sequence;

means for providing a plurality of reference sequences, means for comparing the second sequence with said reference sequences to provide an indication of at least one corresponding sequence in the first notation which corresponds to the second sequence;

and means for selecting one of said at least one corresponding sequence, by comparing at least one of said at least one corresponding sequence with the applied sequence.

2. The apparatus described in claim 1, wherein, when more than one corresponding sequence is indicated, the corresponding sequences are compared with the applied sequence, one at a time, until the corresponding sequence which matches the applied sequence is located.

3. The apparatus described in claim 1, wherein a signal is generated when no corresponding sequence matches the applied sequence.

4. The apparatus described in claim 3, wherein all of the one or more corresponding sequences are selected when said signal is generated.

5. An apparatus for identifying a language word containing a sequence of characters having a first *n*-character alphabet comprising, in combination:

means for converting the applied word into a second *n-m* character alphabet where each character in the second alphabet corresponds to at least one character in the first alphabet and where *m* is positive;

means for providing a plurality of reference words;

means for comparing the converted word in the second alphabet with said reference words to provide an indication of at least one meaningful word in the first alphabet which corresponds to the converted word;

and means for selecting one of said at least one meaningful word by comparing at least one of said at least one one meaningful word with the applied word.

6. The apparatus described in claim 5, wherein when more than one meaningful word is indicated, the indicated meaningful words are compared with the applied words, one at a time, until the meaningful word which matches the applied word is located.

7. The apparatus described in claim 5, wherein a signal is generated when no meaningful word matches the applied word.

8. The apparatus described in claim 7, wherein all of the one or more meaningful words are selected when said signal is generated.

9. The apparatus described in claim 5, wherein numeric or alphanumeric applied words in the first alphabet are not converted and compared, but are directly selected.

10. The apparatus described in claim 5, wherein each reference word and its corresponding one or more meaningful words are stored in parallel as a word-group.

11. The apparatus described in claim 10, wherein a plurality of word-groups are stored in a sequentially-accessible memory.

12. The apparatus described in claim 10, wherein magnetic drum storage is employed.

13. The apparatus described in claim 11, wherein a plurality of memories are employed in parallel.

14. The apparatus described in claim 13, wherein magnetic drum storage is employed.

15. An apparatus for identifying a language word containing a sequence of characters having a first *n*-character alphabet comprising, in combination:

means for converting the applied word into a second *n-m* character alphabet where each character in the second alphabet corresponds to at least one character in the first alphabet and where *m* is positive;

means for providing a plurality of reference words;

means for comparing the converted word in the second alphabet with reference words to provide an indication of at least one meaningful word in the first alphabet which corresponds to the converted word;

means for sequentially comparing each of said at least one meaningful word with the applied word until a match is indicated when an exact match exists, and until all meaningful words have been compared when no match exists;

and means for unambiguously indicating the identity of the applied word to be the meaningful word which matches the applied word when a match exists, and to be the meaningful word when only one meaningful word is indicated, and for ambiguously indicating the identity of the applied word to be a plurality of the meaningful words when more than one meaningful word is indicated.

16. The apparatus described in claim 15, wherein the ambiguous indication of the identity of the applied sequence contains all of the indicated meaningful words.

17. The apparatus described in claim 15, wherein each reference word and its corresponding one or more meaningful words are stored in parallel as a word-group.

18. The apparatus described in claim 17, wherein a plurality of word-groups are stored in a sequentially accessible memory.

19. The apparatus described in claim 18, wherein magnetic drum storage is employed.

20. The apparatus described in claim 18, wherein a plurality of memories are employed in parallel.

21. The apparatus described in claim 20, wherein magnetic drum storage is employed.

22. The apparatus described in claim 17, wherein a detector is employed to provide a signal when all of the one or more meaningful words in a word-group have been compared with the applied word.

23. The apparatus described in claim 15, wherein numeric or alphanumeric applied words in the first alphabet are not converted and compared, but are directly applied as the system output.

24. An apparatus for identifying a language word containing a sequence of characters having a first *n*-character alphabet comprising, in combination:

a source of reference words;

means for converting the applied word into a second *n-m* character alphabet where each character in the second alphabet corresponds to at least one character in the first alphabet and where *m* is positive;

means for comparing the converted word in the second alphabet with reference words to provide an indication of at least one meaningful word in the first alphabet which corresponds to the converted word;

and means for indicating the identity of the applied word to be the meaningful word when only one meaningful word is indicated.

25. An apparatus for identifying a language word containing a sequence of characters having a first *n*-character alphabet comprising, in combination:

a source of reference words;

means for converting the applied word into a second *n-m* character alphabet where each character in the second alphabet corresponds to at least one character in the first alphabet and where *m* is positive;

means for comparing the converted word in the second alphabet with reference words to provide an indication of at least one meaningful word in the first alphabet which corresponds to the converted word;

and means for indicating the identity of the applied word to be one of the indicated meaningful words.

References Cited by the Examiner

Glantz, H. T.: Journal of the Association for Computing Machinery, vol. 4, No. 2, Waverly Press, Inc., Baltimore, Md., 1957 (pp. 178–188 relied on).

ROBERT C. BAILEY, *Primary Examiner.*

R. ZACHE, *Assistant Examiner.*